Patented Nov. 10, 1942

2,301,717

UNITED STATES PATENT OFFICE 2,301,717

COLORED BACTERIAL ANTIGEN

Robert W. Terry, Columbus, Ohio

No Drawing. Application July 25, 1939,
Serial No. 286,430

7 Claims. (Cl. 167—78)

This invention pertains to improvements in producing and utilizing colored bacterial antigens. More specifically, it pertains to the production of a rapid-acting red-colored Salmonella pullorum antigen for use by the whole blood test for locating infection and controlling pullorum disease in fowls.

For some years the only agglutination test used for this purpose was the "tube" agglutination test. In this test, the birds must be leg-banded by number, a sample of blood from each bird collected, and usually sent to a central laboratory for testing. In the laboratory, a small amount of serum from the clotted blood is diluted in small test tubes with a dilute suspension of Salmonella pullorum and incubated. After the incubation period, the tubes are observed for evidences of agglutination and a report sent to the flock owner or "bleeder." While the test is considered quite accurate, it is a slow, laborious and expensive process requiring considerable time and equipment. It is only natural some more rapid method was sought so that larger numbers of birds could be tested more rapidly and economically.

In 1927, Runnells, Coon, Farley and Thorp (Journ. Am. Vet. Med. Assoc., vol. 70, No. 5, p. 660) developed a "rapid serum" test. In this test, a small amount of serum obtained as in the "tube" test is mixed on a glass plate with a small quantity of a concentrated suspension of Salmonella pullorum, agglutination being evident within a few minutes. While this method was an improvement over the tube test in less equipment being needed, it still retained the laborious and expensive banding, and the collecting of samples of blood in vials.

In 1929, Bunyea, Hall and Dorset (Journ. Am. Vet. Med. Assoc., vol. 75, No. 4, p. 408) described a field test wherein a drop of blood was mixed on a glass plate or slide with a drop of concentrated suspension of Salmonella pullorum, agglutination taking place within a minute or two. This test eliminated the banding and collecting of samples of blood in vials as whole blood is used and not serum. The method appeared to be economically acceptable but dust in the poultry house falling on the blood-antigen mixture frequently caused confusing flakes to be evident and the tester was puzzled as to whether the bird was a reactor or not. Likewise, the antigen was not preserved and as the organisms were not killed, it was considered dangerous to use in poultry houses for fear of spreading or starting an infection from its careless handling.

In 1931, Schaffer, MacDonald, Hall and Bunyea published an article (Journ. Amer. Vet. Med. Assoc., vol. 79, No. 2, p. 236) and described a stained antigen for the whole blood test. This material appears to meet the requirements for a sterile, preserved antigen suitable for field use. This antigen is stained violet with crystal violet and preserved with formaldehyde. When mixed with a small regulated quantity of whole blood, violet or purple agglutinated flakes are formed, in the case of a reactor fowl.

The present invention aims to improve the working qualities of the test fluid or antigen, particularly when used in the field with whole blood, to detect pullorum disease among fowls. The improvements contained in this application are not to be construed as applicable to whole blood alone but to blood serum, defibrinated blood, blood plasma, egg-albumin, egg-yolk, and other body fluids of fowls capable of having a diagnostic agglutinin content. Likewise, these improvements are applicable to antigens for the detection of other poultry diseases, such as fowl-typhoid (pullorum antigen usually used), paratyphoid, contagious abortion, fowl cholera, etc. Satisfactorily reactive antigens have been prepared by this preferred formula with the following bacteria also: Salmonella aertrycke, Salmonella anatum, Salmonella enteritidis and Salmonella schottmulleri (para B). Also, these improvements are useful for antigens for use in detecting contagious abortion infection in cattle and man, typhoid and paratyphoid fever in man with whole blood, blood serum and other body fluids.

My investigation disclosed that soluble red dyes similar to blood in color produced very satisfactory antigens and that the blood-colored reaction flakes appeared just as prominent as when a dye contrasting with the color of blood, such as crystal-violet, was used. Further investigation disclosed that the insoluble pigments ground in a ball mill to suitable fineness produced a more satisfactory antigen. In this case the reaction was greatly accelerated and the reaction flakes constituted a larger mass and were more prominent.

This invention is based mainly on the use of finely ground insoluble pigments, particularly those red in color, as coloring matter instead of on the use of soluble dye. The increased clearness of reactions and the accelerated speed of reactions when antigens, so prepared, are used in the field, is a distinct advantage.

Because of the speed with which red pigment antigen reacts, the operator, at the end of the fifteen second period, can observe the mixture and instantly determine whether or not a reaction is present because at the fifteen second period the mixture has either "cracked" to a definitely visible degree or is definitely negative. That is, the reaction comes so fast that the slow formation of confusing flakes is not evident at the fifteen second period.

With stained antigen (violet) on slightly reactive birds, only a small amount of bacterial cells are agglutinated and the operator is trying to see the presence of small purple flakes against a violet-gray background. In the case of red antigen prepared either from pigments or soluble red dyes, the presence of a small amount of red flakes cannot be seen against the red background of the red antigen-blood mixture. Only after a definite degree of agglutination has taken place can a change be noted. This change is readily observed because it is determined not so much by the presence of red flakes but the white background becomes visible through the agglutinated mixture. Since with red antigen only definite reactions are visible, it means that the operator is less confused as he is able to distinguish more readily between a negative bird and a reactor.

The reactions with red pigment antigen are very prominent as compared to violet antigen and of considerable importance is the fact that these reactions may be seen without eye strain and in a poor light. Necessity demands that many flocks be tested in the winter time when visibility is poor, particularly late in the afternoons, and the increased visibility of red pigment antigen reactions means that the test would be interpreted more accurately than with violet antigen. On dark days or late in the afternoon, I have observed that the reactions with violet antigen are hard to see. In fact, some reactors may be passed up. Under these conditions, reactions with red pigment antigen stand out prominently.

In the manufacture of regular violet stained antigen, no matter how careful the manufacturer may be to use a uniform technic in producing each lot, variations exist in their sensitivity and speed of reaction. In manufacturing red antigen, these variable factors can be controlled so each lot of red pigment antigen can be made uniform as to sensitivity and speed.

The following is the preferred method of producing this improved antigen:

A broth suspension of suitable strains of *Salmonella* pullorum is inoculated under sterile technic into flasks or bottles containing culture media of suitable composition for the growth of the organism; the inoculated mass culture being incubated preferably at 37 to 38 degrees centigrade for about six days.

Culture media of the following composition is suitable:

| | Per cent |
|---|---|
| Beef heart infusion (500 grams to litre) | 50.0 |
| Bacteriological peptone | 2.0 |
| Sodium chloride | 0.5 |
| Agar | 3.0 |
| Water sufficient to make | 100. |

Adjust reaction to pH 7.3 and sterilize thirty to forty minutes at fifteen pounds pressure in flowing steam.

The growths are harvested in sterile distilled water, examined microscopically for contamination and any contaminated flasks discarded. The microscopically acceptable containers are pooled and the concentrated emulsion strained under aseptic technic through several thicknesses of sterile absorbent cotton. After straining, a sample is removed to determine its approximate bacterial strength.

Add sufficient sterile distilled water to bring the suspension to approximately 75x a No. 1 McFarland tube (a 1–75 dilution giving a reading of about 47 mm. with a Gates nephelometer).

Then add to each 100 cc. of the roughly standardized suspension 2 cc. of formaldehyde solution and let stand two hours at room temperature. Experience has shown this procedure will produce a sterile suspension. Then this suspension is passed through a sterile Sharples super centrifuge, using the fine delivery jet, following the last of the suspension with about 250 to 300 cc. sterile distilled water. The bowl of the centrifuge should be weighed accurately before centrifuging is started. Weigh the bowl and bacterial paste and determine the weight of the bacterial paste. Remove with aspetic technic the bulk of the bacterial paste with sterile spatulas. The last portions of paste may be removed by the use of sterile brushes and sterile distilled water. Suspend the bacterial paste in sterile distilled water using 1,000 cc. for each 21.5 grams of paste. To each 1,000 cc. of this standardized suspension, add in the following order:

| | Cc. |
|---|---|
| Solution of formaldehyde | 5 |
| Red antigen dye (1) | 20 |
| (2) Solution of ammonium chloride | 50 |

Mix after each addition and shake thoroughly to insure thorough suspension of the bacterial paste. Allow to stand 12 to 24 hours. Agitate again and test for sterility by inoculating three tubes of Hygienic Laboratory broth (with inverted Durham vial) each with a loopful of red antigen. Streak a loopful of red antigen on an agar slant. Incubate, at 37–38 centigrade for 72 hours. No growths should be evident, which proves sterility. In case the red pigment antigen appears too sensitive, its speed may be reduced by adding a predetermined amount of red pigment antigen retarder (3). In case the red pigment antigen appears to react too slowly, its reaction may be speeded slightly by adding a predetermined amount of red pigment antigen accelerator (4).

SPECIAL FORMULARY (1) *Red antigen dye*

| | |
|---|---|
| Alizarine lake (precipitated on alumina) grams | 12.5 |
| Plain antigen (preserved) cc | 140.0 |

Grind in sterile ball mill for 25 hours. Ball mill consists of a porcelain jar—1 quart size with 40% volume capacity of stone (flint) pebbles. Rotates 80 R. P. M.

(This formula produces a sterile dye solution.)

(2) *Solution of ammonium chloride*

| | |
|---|---|
| Ammonium chloride C. P. grams | 200 |
| Distilled water q. s. to cc | 1000 |

Sterilize in flowing steam 30 minutes at 15 pounds pressure.

(3) *Red antigen retarder*

| | Cc. |
|---|---|
| Plain antigen (preserved) (5) | 100. |
| Red antigen dye | 2. |
| Solution of ammonium chloride | 2.5 |

(4) *Red antigen accelerator*

| | Cc. |
|---|---|
| Washed antigen (6) | 100 |
| Red antigen dye (special) (7) | 2 |
| Solution of ammonium chloride | 5 |

(5) Uncentrifuged pullorum antigen containing 0.85% salt and 1% formaldehyde solution and approximate bacterial strength 75x No. 1 McFarland tube.

(6) Pullorum antigen centrifuged and paste suspended in distilled water; 21.5 grams paste per 1000 cc. containing no salt but 5 cc. solution of formaldehyde per 1000 cc.

(7) Same formula as red antigen dye except ground in ball mill for only six hours.

Having described the preferred method of producing the improved antigen, I desire to comment on the formula and process and to point out that many minor modifications of this specific formula are possible to accomplish essentially the same desirable features.

While insoluble pigments appear to be the preferred coloring matter, satisfactory antigens may be produced by red colored soluble dyes, such as methylene violet, erythrosin, eosin and rhodamine.

While washed or centrifuged antigen appears best, plain or uncentrifuged antigen may be used. Washed antigen appears to produce a slightly more rapid antigen.

Insoluble but properly ground pigments other than alizarine lake may be used. Carmine, toluidine toner, and lithol red toner (barium salt) all make satisfactory rapid antigens. Applicant believes alizarine lake to be the preferred red pigment. Pigments of other colors properly ground also make rapid acting antigens, such as milori blue (slowly decolorizes) producing a blue-violet antigen and orchid lake producing a purple antigen.

The preferred method of making this improved antigen wherein the pigment is ground in plain pullorum antigen shows under the microscope that the bulk of the particles of pigment are approximately three microns in diameter and not in excess of five microns, being irregular in shape but mostly spheroidal and of such mass as just to show Brownian movement.

The dye used in making the accelerated antigen wherein it is ground for a shorter period shows the majority of the particles to be several times larger than those of the regular or preferred grinding period. In other words, the smaller the particle size of the pigments, the slower acting the antigen. It was also shown that coarse ground pigments produced false reactions, hence the necessity of proper particle size of the pigment.

While formaldehyde in approximately 0.5% of the official solution appears to be the preferred preservative, other preservatives are acceptable, such as furfuraldehyde and paraldehyde each at approximately 2.5% concentration. Phenol and many phenolic compounds are not usable as they coagulate the blood and in many instances produce false positive reactions. On quite a few samples of blood early clotting is evident if the antigens made from soluble dyes do not contain formaldehyde.

It was noted that with antigens made of properly ground pigments, there was a greater tendency for blood to clot than with antigens prepared from soluble dyes, the pigment particles probably offering extra coagulating surfaces on which the blood may clot.

It was found that the addition of approximately 1% ammonium chloride greatly retarded this tendency for the blood to clot or "gel." Some other ammonium compounds and other chlorides also exhibited this property. This is not due to the acid reaction of the ammonium chloride as antigen acidified to the same pH with acetic or hydrochloric acid failed to retard these false reactions. It was also noted that the ammonium chloride appeared to accelerate the reaction slightly with whole blood and to make the reaction flakes larger and more easily seen; it failed to do this with serum.

Other useful compounds having essentially the same properties on whole blood as ammonium chloride, appear to be: ammonium sulfate, nitrate, phosphate dibasic, acetate and lactate (neutral). All used in approximately 1% concentration of the anhydrous compound. Other useful compounds appear to be manganese chloride, sodium chloride (fair), magnesium chloride and lithium chloride.

While the mechanism of the agglutination test has been the subject of many extensive investigations, it is still a controversial subject. It appears quite certain, however, that the surface of the bacterial cell is intimately associated with the reaction. In the case of violet stained antigen or any antigen made from a soluble dye, the bacterial cells become coated or stained with this dye. In the case of antigen made from insoluble pigments, the bacterial bodies are not stained. This may readily be observed by allowing both types of antigen to be centrifuged or allowed to stand undisturbed for a sufficient time, or by microscopic examination. In the case of a soluble dye, the deposited bacteria form a heavy stained mass in the bottom of the vessel; in the case of the insoluble pigment antigen, the pigment is seen to be deposited first as a densely colored layer and on top of this layer, the colorless (white) deposit of the unstained bacteria is observed. It is believed that in the case of insoluble pigment antigen, the fact that the bacterial cells are not coated with any material may account, in part, for its accelerated reactivity.

Under the microscope, in the case of a soluble dye antigen, the bacterial bodies are seen to be stained and when mixed with positive serum the agglutinated masses appear to consist wholly of entangled bacterial bodies; in the case of insoluble pigment antigen, under the microscope, the fluid appears to be a heterogenous suspension of unstained bacterial cells and pigment particles. In the case of the preferred formula above described, the pigment particles appear to occupy a mass or volume at least as great as the bacterial bodies. When positive serum is brought in contact with this type of suspension, the agglutinated masses are seen to consist of entangled and unstained bacterial bodies as well as pigment particles. The entangled masses appear to consist of about an equal bulk of pigment particles and bacteria. It is believed that this extra volume or mass of the reacting flakes is due to the presence of the insoluble pigment. It is believed that this accounts for the more easily observed reactions with an insoluble pigment antigen. It also is believed that the surfaces of these pigment particles aid in bringing the bacterial bodies together more rapidly, hence accelerating the speed of the reaction.

It is pointed out that in the case of crystal-violet antigen, each 100 cc. contains 0.03 gram of dry dye. In the case of the preferred formula for insoluble pigment red antigen, each 100 cc. contains 0.153 gram of dry pigment or approximately five times as much as in the case of soluble dyes.

What is claimed is:

1. As a new composition of matter, a diagnostic product comprising a concentrated suspension of *Salmonella pullorum*, approximately 0.5% formaldehyde solution, approximately 1% ammonium chloride, and approximately 0.15% of finely ground alizarine lake, consisting mostly of particles of the order of three microns in size, all suspended in distilled water.

2. As a new composition of matter, a diagnostic product comprising a concentrated suspension of a pathogenic bacteria in distilled water, approximately 0.5% formaldehyde solution, approximately 1% ammonium chloride, and approximately 0.15% of finely ground alizarine lake, consisting mostly of particles not greater than 5 microns in size, said product possessing the property when mixed with blood or serum of rapidly agglutinating in the case of positive reactions into deeply colored clumps that are readily observable and easily distinguished from the non-agglutinated mixtures with negative or non-reactive blood or serum.

3. As a new composition of matter, a diagnostic product for the detection of pullorum disease in fowls comprising a concentrated suspension of *Salmonella pullorum* in distilled water, approximately 0.5% formaldehyde solution, approximately 1% ammonium chloride, and not more than 0.6% of finely ground insoluble pigment, consisting mostly of particles not greater than 5 microns in size, said product possessing the property when mixed with blood or serum of fowls infected with pullorum disease of rapidly agglutinating into deeply colored clumps that are readily observable and easily distinguished from the non-agglutinated mixtures of blood or serum of fowls not infected with pullorum disease.

4. In a process of preparing colored antigens of pathogenic bacteria, the steps which consist in introducing into such bacterial suspension a ground insoluble pigment in a concentration not greater than 0.6% and consisting mostly of particles not greater than 5 microns in size, said product possessing the property when mixed with blood or serum of rapidly agglutinating in the case of positive reactions into deeply colored clumps that are readily observable and easily distinguished from the non-agglutinated mixtures with negative or non-reactive blood or serum.

5. As a new composition of matter, a diagnostic product comprising a concentrated suspension of a pathogenic bacteria in distilled water, colored by the presence of an insoluble pigment of a fine particle size, said product possessing the property when mixed with blood or serum of rapidly agglutinating in the case of positive reactions into deeply colored clumps that are readily observable and easily distinguished from the non-agglutinated mixtures with negative or non-reactive blood or serum.

6. As a new composition of matter, a diagnostic product comprising a concentrated suspension of a pathogenic bacteria in distilled water, a suitable preservative, and approximately 1% ammonium chloride, and colored by the presence of an insoluble pigment of a fine particle size, said product possessing the property when mixed with blood or serum of rapidly agglutinating in the case of positive reactions into deeply colored clumps that are readily observable and easily distinguished from the non-agglutinated mixtures with negative or non-reactive blood or serum.

7. A new agglutinative reagent comprising in addition to the agglutinative principle an insoluble pigment in a fine state of subdivision, said reagent possessing the property of agglutinating in the case of positive reactions in deeply colored clumps that are easily distinguished from non-agglutinated tests, said positive reaction being completed for observation within a period of substantially 15 seconds or less.

ROBERT W. TERRY.